United States Patent [19]

Strohlein

[11] 3,882,950

[45] May 13, 1975

[54] VEHICLE POWER SYSTEM FOR LIMITED VEHICLE MOVEMENT WITHOUT USE OF FUEL

[76] Inventor: James Neil Strohlein, 11618 Hitching Post Ln., Rockville, Md. 20852

[22] Filed: July 11, 1972

[21] Appl. No.: 270,867

[52] U.S. Cl............... 180/54 R; 60/6; 74/572; 74/859; 123/179 J; 192/.033; 192/.077
[51] Int. Cl.............................. B60k 9/00
[58] Field of Search............ 180/54 R, 65 A, 1 R; 74/751, 843, 856, 859, DIG. 11, 572; 192/.033, .077; 60/6; 123/179 J

[56] References Cited
UNITED STATES PATENTS

| | | | |
|---|---|---|---|
| 2,062,583 | 12/1936 | Kruczek | 180/1 R |
| 2,301,440 | 11/1942 | Nardone | 123/179 J |
| 2,443,770 | 6/1948 | Kasschau | 180/65 R |
| 2,525,946 | 10/1950 | Roberts | 74/751 |
| 2,803,151 | 8/1957 | Clerk | 74/751 |
| 3,493,066 | 2/1970 | Dooley | 180/54 R |
| 3,503,464 | 3/1970 | Yardney | 180/65 A |
| 3,650,345 | 3/1972 | Yardney | 180/65 A |
| 3,734,222 | 5/1973 | Bardwick | 180/54 R |

*Primary Examiner*—David Schonberg
*Assistant Examiner*—Milton L. Smith

[57] ABSTRACT

A vehicle power system which consists of a primary source of power for driving a vehicle and means for withdrawing surplus power from this primary source during the operation of the vehicle and storing said surplus power in a flywheel operatively connected to the drive train of the vehicle at selected times, preferably under those operating conditions when the prime motive force of the vehicle does not operate efficiently, such as in stop-and-go traffic. Control means are provided to permit automatic sensing of vehicle motions and to selectively connect the stored energy source or flywheel to the vehicle drive train to cause movement of the vehicle, while interrupting operation of the primary source of power, such as the vehicle engine. Additional control means are employed to sense the amount of energy stored in the stored energy source or flywheel (i.e., energy reservoir) and to automatically cause "recharging" of the energy reservoir when the stored energy source falls below a predetermined level.

11 Claims, 7 Drawing Figures

PATENTED MAY 13 1975

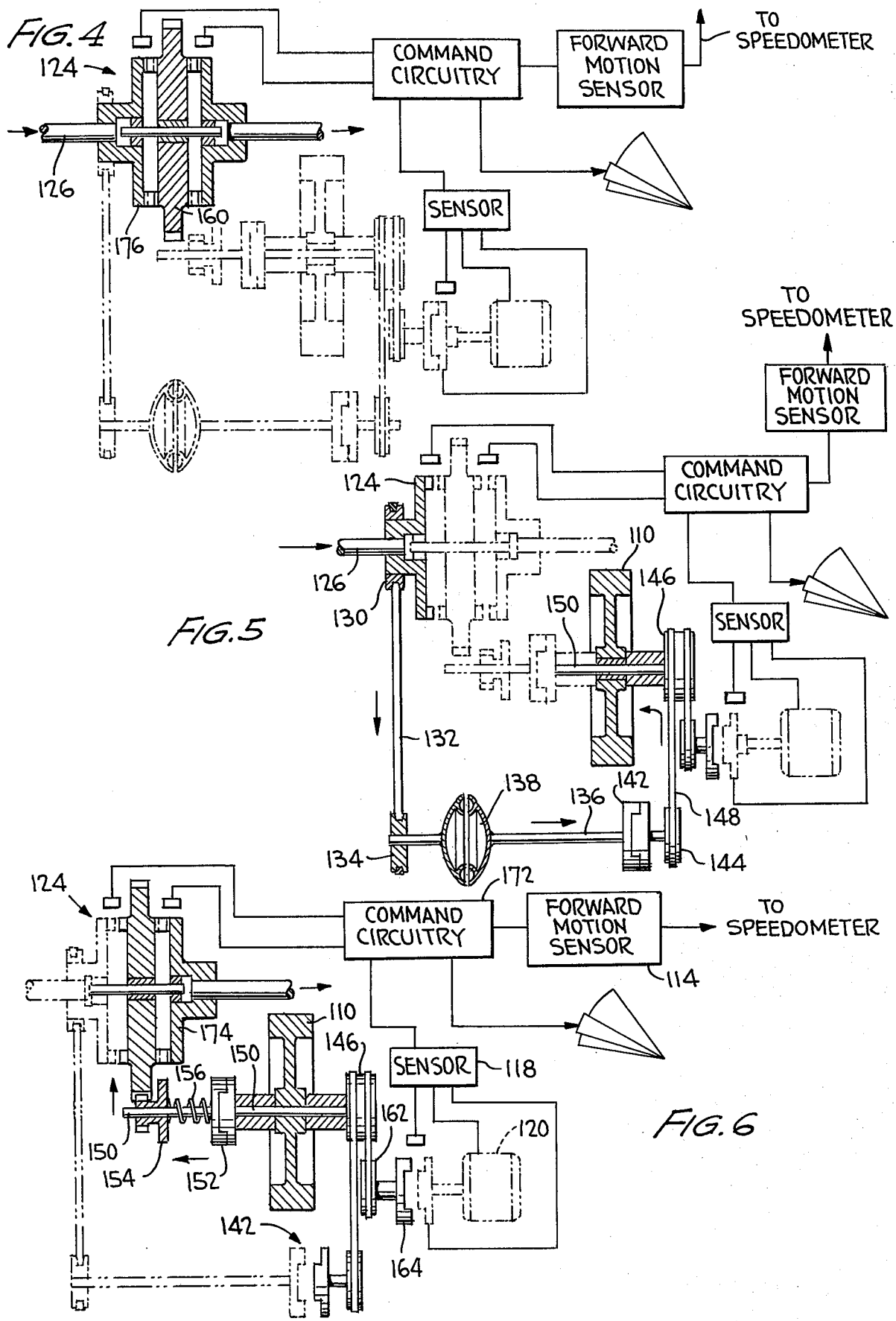

3,882,950

VEHICLE POWER SYSTEM FOR LIMITED VEHICLE MOVEMENT WITHOUT USE OF FUEL

BACKGROUND OF THE INVENTION

1. Field of the Invention

This invention relates to a novel vehicle power system, and more particularly, a power system which permits limited vehicular movement without engine operation, thereby decreasing fuel consumption and the emission of air pollutants.

Internal combustion piston type automotive engines face an uncertain future. On one hand there is a limited supply of the economically recoverable fossil fuel necessary for their operation. On the other hand they are under attack because of the polluting nature of their exhaust products.

The supply of fossil fuel is essentially finite and as such must be preserved for future use as much as possible. At present there is no economical or technically acceptable substitute for the piston driven internal combustion engine. Fuel economy could be recognized in these engines, if there were some auxiliary power source available for operation during periods of peak acceleration or for use in heavy traffic situations where the car is virtually inched along due to the volume of traffic. Both of these conditions, rapid acceleration and heavy traffic, are prime producers of air pollution also, and thus a reduction of the engine operation level during these periods would necessarily result in a commensurate reduction in the level of air pollution also. This reduction is not simply a linear function of operating level since it has been observed that during these peak periods of operation disproportionally more fuel is consumed and the products of combustion and unburnt fuel are not in the same proportion as when the engine is operating at cruising speed under optimal combustion conditions.

2. Description of the Prior Art

It has been suggested that if the excess energy available economically, efficiently, and without resulting in additional pollution, at the cruising speed, could be stored for use when added power is required then considerable reductions in fuel consumption and effluent production could be recognized. Several systems have been proposed for storing power during periods of light loading for subsequent use. One device of this type includes an engine permanently and mechanically connected to two massive flywheels which aid the engine in propelling the vehicle when moving uphill. The successful operation of this prior art device is unknown but certain disadvantages are immediately apparent. For example, with a fixed mechanical connection between the flywheel and the engine, there could be no selective tapping of the energy stored in the flywheel at desired periods, such as, for example, for overtaking another vehicle while traveling on the level. Furthermore, such a system wherein the stored energy was automatically delivered to the engine whenever the latter slowed down, could actually be dangerous during periods in which it was desired to effect rapid braking of the vehicle. Another disadvantage might arise on starting, in that the usual electric starter motor would be required to turn over not only the engine but also the flywheel which is mechanically connected to the engine.

A second earlier vehicle system obviating the disadvantage of the permanent mechanical connection utilizes flywheels driven by an electric motor which received its power from an electrical generator driven by the vehicle engine. However, this system made no provision for delivering any of the energy stored in the flywheels back to the engine at times when additional power was desired.

A third approach has been patented by James L. Dooley (U.S. Pat. No. 3,493,066). Dooley provides a means and method whereby an internal combustion engine supplies mechanical power to the motion producing means and also diverts a portion of this power output to an alternator which in turn drives an electric motor which is caused to drive a flywheel to store mechanical energy in the flywheel. The flywheel is selectively engaged with the engine to provide a mechanical power supplement therefore at predetermined times. A preferred embodiment of Dooley's system is shown in FIG. 1 of the drawings herein and is labeled prior art.

While Dooley has overcome the major objection to the pre-existing prior art, he does not disclose a viable solution to the problem since his device is very complex and inefficient requiring a conversion from mechanical to electrical energy; from alternating current to direct current; and from direct current back to mechanical energy which is then stored in the flywheel. When it is desired to supplement the output of the internal combustion engine, the driver must manually operate a selective clutch to couple the flywheel to the engine. Dooley does not provide for any automatic sensing of the operating conditions of the engine in order to operate the clutch in respone to a sensed need for additional power during the operation of the vehicle. Further, Dooley's internal combustion engine is operating 100 percent of the time, whether power is being supplied to the drive train from the stored energy source or not. In fact, Dooley provides no means of directly driving the vehicle from the stored energy source.

OBJECTS OF THE INVENTION

It is therefore an object of this invention to provide a means for automatically moving a vehicle forward for short distances by application of energy from a stored energy source, without use of the vehicle engine.

It is a further object of the invention to reduce the operating time of automotive engines when the vehicle is at a standstill or is in slow moving traffic.

It is a further object of the invention to provide a method and means for smoothly restarting the engine when it is necessary to travel longer distances or at higher rates of acceleration than is available from the stored energy source.

It is a yet further object of this invention to provide a method and means for automatically selecting the mode of providing the auxilliary power to a vehicle drive train by sensing the speed of the vehicle.

Another object of the invention is to provide a control means and method for determining the optimum mode of operation of a vehicle and of effecting operation in said mode. These and other objects of the invention will be evident from the following description of the invention.

SUMMARY OF THE INVENTION:

These objects of the invention are accomplished by providing a vehicle power system which consists of a primary source of power for driving a vehicle and means for withdrawing surplus power from this primary source during the operation of the vehcile and storing said surplus power in a flywheel operatively connected to the drive train of the vehicle at selected times, preferably under those operating conditions when the prime motive force of the vehicle does not operate efficiently, such as in stop-and-go traffic. Control means are provided to permit automatic sensing of vehicle motions and to selectively connect the stored energy source or flywheel to the vehicle drive train to cause movement of the vehicle, while interrupting operation of the primary source of power, such as the vehicle engine. Additional control means are employed to sense the amount of energy stored in the stored energy source or flywheel (i.e., energy reservoir) and to automatically cause "recharging" of the energy reservoir when the stored energy source falls below a predetermined level. The recharging operation is discontinued upon reaching the optimum operating or the maximum energy level of the reservoir.

The system is operative in two modes. In the normal mode, the primary power source or vehicle engine is directly connected to the drive train and the auxiliary flywheel (power reservoir) is recharged directly from the primary power source, but does not itself impart any energy to the drive train. At extremely low speeds in high traffic situations, the primary source of power is automatically disconnected and the auxiliary power source is employed to operate the vehicle. Because of these modes of operation, it is possible to:

a. store "surplus energy" in an energy reservoir;
b. selectively withdraw energy from the reservoir while the primary power source is disconnected from the drive train; and
c. selectively withdraw some of the stored power to aid in restarting the primary power source while it is disconnected from the drive train.

Basically, the system depends upon a rotational energy store, in the form of a flywheel, which is able to provide energy for the intermittent forward motion of the car or the restart of the engine. The energy level of the flywheel is maintained by sensors which call for resupply either from the running engine or from an auxiliary electric motor powered by the vehicles battery.

In operation, a forward motion sensor causes interruption of the ignition circuit and thus stopping of the engine when the vehicle comes practically to a standstill in traffic conditions. A slight pressure on the accelerator pedal causes coupling of the stored energy source directly to the drive train thus providing forward movement without use of the vehicle's engine. This would continue until the vehicle was required to stop or the energy in the reservoir was depleted to a given level. In the latter condition, an auxiliary electric motor would be employed to recharge the power reservoir. When continuous forward motion is required, at a speed greater than crawling, the pedal position sensor would enable the coupling of the flywheel to the engine and the closing of the ignition circuit for restart of the primary power source and reversion to the normal driving mode.

Further objects and advantages of the invention will become apparent from the following description and claims and from the accompanying drawing wherein:

BRIEF DESCRIPTION OF THE DRAWINGS

FIG. 4, partly in section, partly in phantom, shows the mode of operation where the primary power source is directly coupled to the drive train;

FIG. 5 is a view partly in section, partly in phantom, of the primary power source being directly connected to the energy reservoir;

FIG. 6 shows in section the energy reservoir being directly connected to the drive train to produce vehicular motion.

Figure 1:
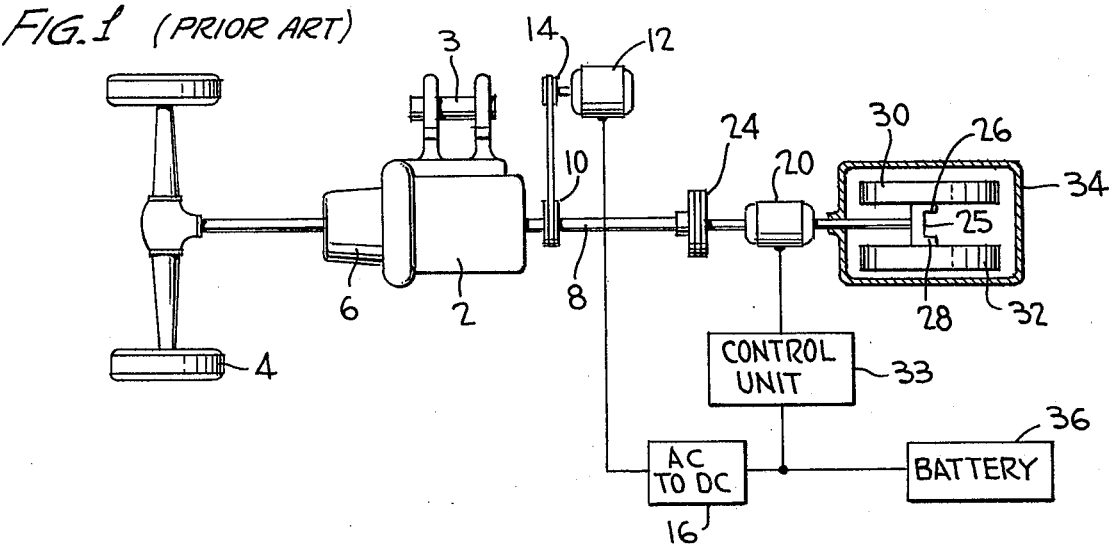
FIG. 1 is a representational block diagram of a prior art vehicle power system.

DESCRIPTION OF THE PREFERRED EMBODIMENT:

Referring specifically to the drawings in detail wherein like elements are indicated by like numerals throughout the several views, a prior art system of which this invention is an improvement is shown in FIG. 1.

The system shown in FIG. 1 includes an automobile engine 2 drivingly connected with a pair of vehicle drive wheels 4 by an automatic transmission 6. The engine 2 may be provided with a turbo charger 3 to increase its power output. Connected to the usual engine crankshaft (not shown) of the engine 2 is an engine input shaft 8 provided with a fixed pulley 10.

A conventional automobile alternator 12 having a drive pulley 14 is drivingly connected with the shaft pulley 10 on the engine input shaft so that as the engine input shaft 8 rotates during operation of the engine, the alternator 12 is driven to produce alternating current. The alternating current output from the alternator 12 is applied to a conventional, current converter 16 for converting the alternating current to direct current. Any commercially available form of converter such as a rotary converter, or selenium bridge full wave rectifier may be used as desired. A conventional automobile D.C. generator could alternatively be utilized, if desired, to provide the necessary D.C. output.

The rectified D.C. output of the converter 16 is applied to a direct current motor 20 having a power shaft 22 passing entirely through the motor 20 and aligned concentrically with the engine input shaft 8. The adjacent ends of the engine shaft 8 and the power shaft 22 may be selectively, drivingly connected together by a selectively operated, conventional, slip clutch 24 interposed between and connected to the shafts. The clutch 24 is under the direct control of the driver of the vehicle for operation at any desired time.

At its other end, the power shaft 22 is drivingly connected to a bevel gear 25 meshingly engaging two pinion gears 26 and 28 mounted on the vehicle body for rotation about concentric axis perpendicular to the axis of the power shaft 22 and spaced on opposite sides thereof. The pinions 26 and 28 are fixedly connected to associated flywheels 30 and 32, respectively, for concurrent rotation therewith. Suitable low friction bearings (not shown) are provided for the rotating flywheels and pinions.

It will be appreciated that the bevel and pinion gear system described insures that the flywheels 30 and 32 rotate in opposite directions to eliminate gyroscopic precession forces. In addition, the gear ratio between the bevel and pinion gears is such as to insure that when the flywheels are rotating at their predetermined full speed, the rotational speed of the power shaft 22 is considerably in excess of any maximum rotational speed of the engine input shaft 8 encountered in normal use of the engine 2.

The flywheels 30 and 32 are relatively massive. Together they have a mass equivalent to a substantial proportion of the mass of the engine 2 and are rotated by the motor 20. The motor 20 is provided with a conventional control unit 33 which permits the motor 20 to run at a predetermined full speed and not to exceed the full speed. At the predetermined maximum speed of the motor 20, the flywheels store sufficient energy to provide for rapid acceleration of the vehicle from standstill to its maximum operating speed at least one when engaged with the drive wheels.

The flywheels 30 and 32 are also enclosed in a sealed compartment 34 filled with a gas of low molecular weight to reduce windage losses acting on the wheel so that their rotating motion may be improved. In the preferred embodiment, hydrogen is used, through other suitable low molecular gases, or vacuum may be provided.

A direct current electrical storage battery 36 of any conventional type is also connected to supply the electric motor 20 for a purpose to be described. The battery 36 is connected in parallel with the converter 16 to be charged thereby when the alternator is running.

In operation, the vehicle is started by disengaging the clutch 24 to disconnect the power shaft 22 from the engine shaft 8. The battery 36 is then electrically connected to the motor 20 to turn it until the wheels 30 and 32 are rotating rapidly. At this time, the clutch 24 is engaged to drivingly connect the power shaft 22 with the engine input shaft 8 so that some of the mechanical rotational energy stored in the wheels is imparted to the engine 2 to turn it over rapidly to provide a quick start. The automatic transmission 6 is then engaged and the vehicle starts to move.

Once the operating speed has been reached, the engine 2 has sufficient power output on its own to keep the vehicle traveling continuously on the level at the same speed with the engine 2 operating at less than full load. An additional portion of the mechanical power output of the engine 2 is delivered to the alternator 12 and converted into alternating electrical current. The electrical current is converted into direct current by the converter 16 and applied to the electric motor 2 to run the flywheels 30 and 32 up to their predetermined full operating speed. Once the flywheels have reached their predetermined full speed, the control unit 33 prevents further increase in the speed of the flywheels by the electric motor. At this time, the power output requirement of the engine 2 will decrease somewhat with the result that the driver will be able to maintain the same road speed although easing back somewhat on the engine fuel intake as determined by his foot pressure on the accelerator pedal.

When it is desired to slow the vehicle, the clutch 24 is left disengaged and the vehicle braked in the normal manner so that the stored energy in the flywheels is not permitted to act against the desired retardation, as it would if the flywheels were permanently mechanically coupled to the engine. After the vehicle has been brought to rest, the flywheels 30 and 32 continue to spin for some hours. This is due to the very low friction of the previously described anti-friction bearings and due to the provision of the hydrogen atmosphere in which they are enclosed.

While the prior art discloses an operable power supplement system, it is not practical because it requires the inefficient conversion of mechanical to electrical energy; from alternating current to direct current; and from direct current back to mechanical energy which is then stored in the flywheels, When it is desired to supplement the output of the internal combustion engine, the driver must manually operate the selective clutch 24 to couple the flywheels 30 and 32 to the engine through the shafts 22 and 8. The prior art does not provide for any automatic sensing of the operating conditions of the engine in order to operate the clutch in response to a sensed need for additional power during the operation of the vehicle. Further, the prior art's internal combustion engine is operating 100 percent of the time, whether power is being supplied to the drive train from the stored energy source or not. In fact, there are no means of directly driving the vehicle from the stored energy source.

The present invention provides a means for automatically moving the vehicle forward for short distances or smoothly restarting the engine when continuous forward movement is required, during stop-and-go driving without use of the internal combustion engine, bur rather from a direct coupling of a stored energy source to the drive train of the vehicle. This will reduce the operating time of the automotive engine when the vehicle is at a standstill or is slowly crawling forward in short increments, such as in heavy traffic.

An auxiliary power source is provided with stored energy, such as a flywheel with low friction bearings, which is used to provide the inertial energy for the intermittent forward movement or the restart of the engine. The energy level is maintained by sensors which call for resupply either from the running engine or from an auxiliary electric motor powered from the vehicle battery when the engine has been shut down. A forward motion sensor is provided which automatically causes interruption of the circuit thus stopping the engine when a vehicle comes to a standstill in traffic. When forward motion is again required, slight accelerator pedal depression normally used for crawling forward causes coupling of the energy directly to the drive train, thus providing forward movement without use of the vehicle's engine. This would continue until the vehicle comes to a stop at which time the energy level sensor would cause the auxiliary electric motor to operate and recharge the energy source, if required. When continuous forward motion is required, at a speed greater than crawling, the pedal position sensor would enable coupling of the reserve energy source (flywheel) to the engine and closing of the ignition circuit for restart to revert to a normal driving mode. The coupling of the auxiliary energy source to the engine will also enable quicker starts and recharge the auxiliary energy source.

Vehicles equipped with the auxiliary power means of the present invention would not only show a reduced level of air pollutants, since the engine is rendered inoperative at the peak conditions when pollutants would normally be discharged, but would realize lower fuel consumption.

Figure 2:
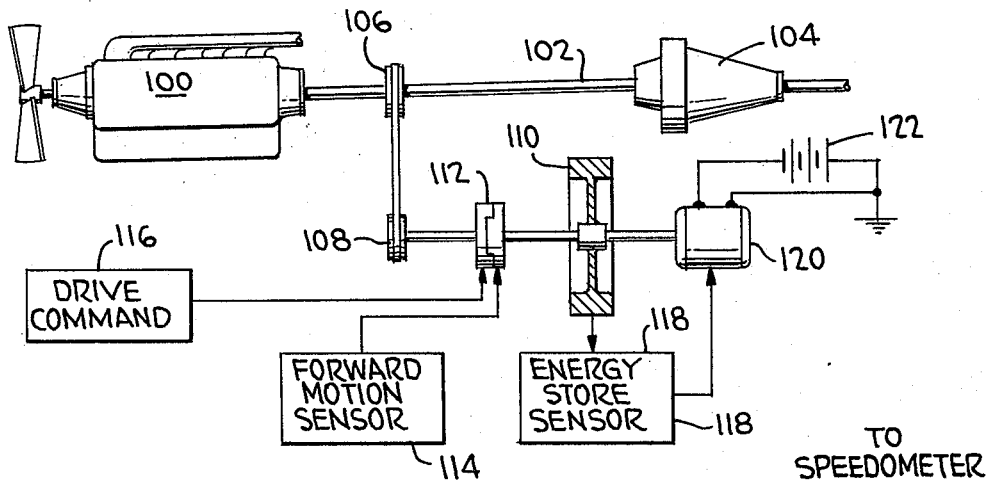
FIG. 2 is a representational block diagram of a preferred embodiment of the instant vehicle power system.

FIG. 2 is a representational diagram illustrating the operation of the system of this invention. An internal combustion engine 100 of the vehicle is normally coupled through a power shaft 102 to the drive train or transmission 104 which in turn is connected to the wheels of the vehicle for propelling it. Power is normally diverted from the engine 100 through pulleys 106 and 108 to directly store mechanical energy in an auxiliary energy reservoir such as a flywheel 110. The coupling of the flywheel 110 is controlled through a series of clutch couplings 112.

These clutch couplings will disengage flywheel 110 from engine 100 when the vehicle comes to a standstill in traffic. The clutch couplings are controlled by a forward motion sensor 114 of conventional design which also will cause the ignition circuit of the vehicle to open to stop engine operation. When forward motion is again required, slight accelerator pedal depression represented by the block labeled "Drive Command" 116 would cause re-engagement of source of the clutch couplings to couple flywheel 110 directly to drive train 104 to impel the vehicle forward. The stored energy in flywheel 110, that is, its rotational inertia, will impart movement to the wheels through drive train 104, even though engine 100 is rendered inoperable. When the vehicle is required to stop again, an energy level sensor 118 of conventional configuration will sense the amount of inertial rotation remaining in flywheel 110 and if sufficient to impart movement to the drive train and vehicle wheels, will activate an electric motor 120 electrically connected to the vehicle battery 122 to cause rotation of flywheel 110 and restoration of energy reserve to the flywheel 110. When continuous forward motion is required, at a speed greater than crawling, the drive command or accelerator pedal position sensor 116 will cause some of the clutch couplings to recouple flywheel 110 to engine 100 and close the ignition circuit for restarting of the engine to revert it to normal drive mode, with any remaining rotational inertia in flywheel 110 aiding in cranking the engine 100 for a quick restart. With flywheel 110 coupled to engine 100, the rotational inertial of the flywheel 110 will again be recharged.

FIGS. 3, 4, 5 and 6 illustrate the actual operating components of the system of the invention during various stages of operation.

Figure 3:
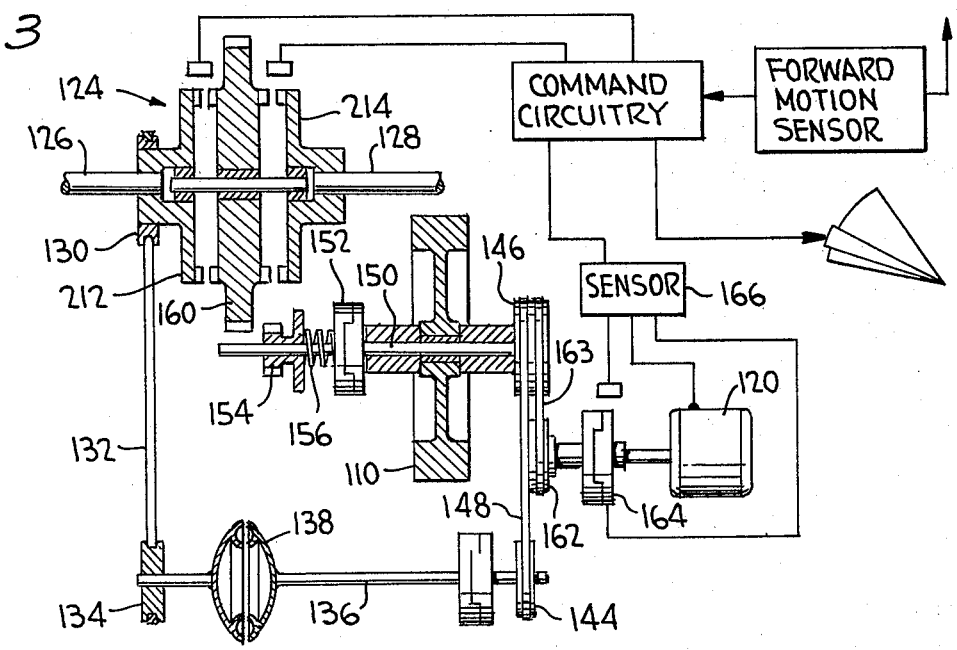
FIG. 3 is a view partially in section illustrating the overall system and the control circuitry required for efficient operation.

FIG. 3 illustrates the overall system and includes a clutch unit 124 coupling the engine shaft 126 to the drive train shaft 128. A pulley 130 seated on the left-hand clutch plate of clutch unit 124 is coupled by a belt 132 to drive a pulley 134 fixed to a shaft 136. Fixed to shaft 136 is an impeller 138 which is used for replenishing energy directly from the engine 100 to a massive flywheel 110. Seated on shaft 136 is a clutch coupling 142 for connecting the flywheel 140 directly to the engine.

Clutch coupling 142 constitutes a part of the series of clutch couplings 112 and is coupled through a pulley 144, a double pulley 146 and belt 148 to the flywheel 110. Flywheel 110 is fixed to a shaft 150. Also mounted on shaft 150 is a "Bendix" clutch coupling 152 and a pinion gear 154. Pinion gear 154 is adapted to slide on shaft 150 under the urging of a spring 156 into and out of meshing engagement with a hub gear 160, which also acts as the central center plate of clutch unit 124. Clutch coupling 152 and gears 154 and 160 also constitute a portion of the series of clutch couplings 112 as will be more fully explained hereinafter.

The flywheel 110 is also coupled through double pulley 146 and pulley 162, via belt 163 to an electric motor 120. The coupling is controlled by clutch coupling 164 which is responsive to a sensor 166 which monitors the rotational energy stored in flywheel 110, and will activate motor 120 when the stored rotational energy is below a predetermined level.

The various operational modes of the elements of the power system are depicted specifically in FIGS. 4 to 7.

Referring specifically to FIG. 5, the portion of the components of the system depicted in solid lines illustrate the mode of charging of the energy source directly from the engine. Clutch coupling 142 is engaged to permit direct connection between engine shaft 126 and flywheel 110 through pulleys 130, 134, and belt 132, impeller 138, shaft 136, clutch coupling 142, pulleys 144, 146, and belt 148, and shaft 150. Rotation of flywheel 110 directly from the engine can take place either during idling at which time clutch unit 124 is disengaged thereby precluding a direct drive from the engine to the drive train or during forward motion of the vehicle at a speed greater than crawling in which event clutch unit 124 would be engaged as shown in full lines in FIG. 4.

During a period of stop-and-go driving forward motion sensor 114 will cause interruption of the ignition circuit to stop the operation of engine 100 when the vehicle comes to a standstill. The elements of the power system depicted in full lines in FIG. 6 will then become operational when forward motion is again required. Slight accelerator pedal depression indicated by the angle $\alpha$, for example, an accelerator pedal 170 will couple flywheel 110 to the drive train through clutch 124.

Forward motion sensor 114, when the vehicle is below a predetermined critical speed, will cause clutch coupling 142 to disengage as well as causing interruption of the ignition circuit. Slight depression of accelerator pedal 170 will activate conventional command circuitry 172 to cause the right-hand clutch plate 174 of clutch unit 124 to engage with the central portion of clutch unit 124 or hub gear 160. Simultaneously, clutch coupling 152 is activated to cause rotation and linear movement of pinion 154 along shaft 150 under urging of spring 156. Pinion 154 is slid laterally along shaft 150 under the urging or coil spring 156 into meshing engagement with central hub gear 160 of clutch unit 124. The rotational energy stored in flywheel 110 will be then imparted to the drive train through clutch coupling 152, pinion 154, hub gear 160, and right-hand clutch plate 174 of clutch unit 124. Flywheel 110 would thus enable limited forward movement of the vehicle without use of the vehicle's engine. This would continue until the vehicle was required to stop. At this point, sensor 118 could be activated, if insufficient inertial energy remains in flywheel 110, which will cause clutch coupling 164 to close and activate electric motor 120, which through clutch coupling 164, pulley 162, and double pulley 146 will cause rotation of flywheel 110 or its recharging. Accordingly, sufficient inertial energy will be stored in flywheel 110 should it be called upon again to supply motion of the vehicle through clutch unit 124.

When continuous forward motion is again required, at a speed greater than crawling, the command circuitry will sense the position of the accelerator and close clutch coupling 142 and re-engage the left-hand plate 176 of clutch unit 124 with the clutch facing on hub 160 to directly reconnect the engine shaft 126 to the drive train through clutch unit 124. Simultaneously, the command circuitry will close the ignition circuit for restarting the engine, thus completing the reversion of the power system to normal drive mode. Any remaining rotational inertia in flywheel 110 aids in cranking the engine 100 to insure quick restart.

Figure 7:
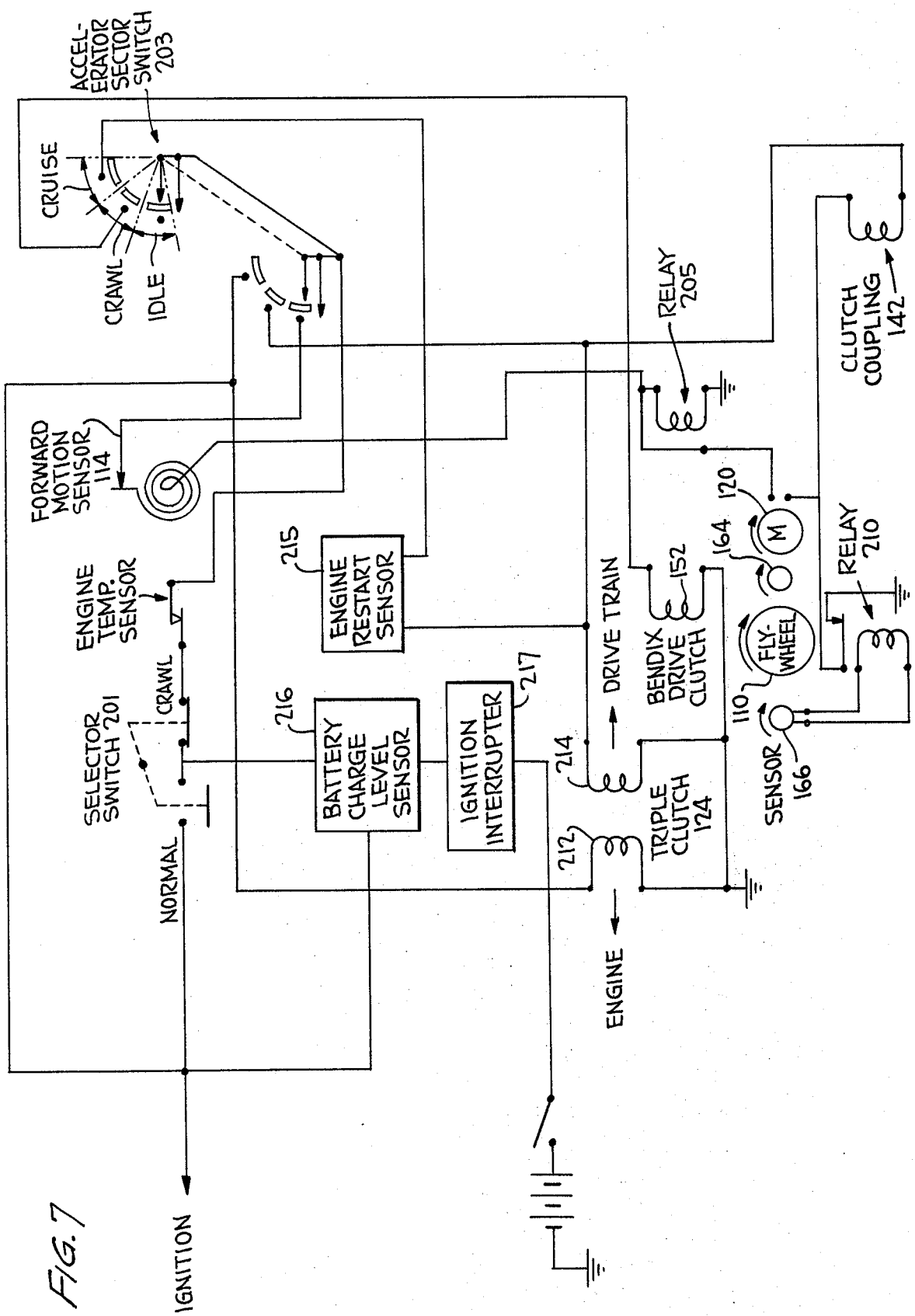
FIG. 7 is a schematic diagram of the electrical components of the vehicle power system.

The command circuitry 172 and its particular mode of operation is illustrated schematically in FIG. 7.

When a selector switch 201 is in "crawl" mode, the position of the selector switch directly coupled to the accelerator controls the function of the various components through the logic contained within the command circuitry 172. This logic requires that one of the "and" conditions is that the engine must be sufficiently warm to insure rapid re-start. Another required "and" condition is that the level of charge in the battery be sufficiently high to permit re-supply of energy to the auxiliary flywheel through the electric motor. Thus, unless these two conditions are satisfied, the system is interlocked against operation under unfavorable conditions. Assuming these two conditions are met, the relative position of the accelerator will cause the following sequences to occur:

"Idle" — When an accelerator switch 203 is in idle sector and forward motion sensor 114 indicates vehicle velocity is less than crawl speed, conditions are met which cause energy replenishment relay contacts 205 to close thus engaging clutch coupling 164 between electric motor 120 and auxiliary flywheel 110. Directly connected to flywheel 110 is a tachometer generator 166 whose output (at the desired flywheel velocity) is sufficient to actuate relay coil 210 thus interrupting electrical energy to motor 120 by disengaging clutch coupling 164.

"Crawl" — Accelerator switch 203 in crawl sector causes clutch 152 to engage thus meshing the pinion gear 154 of the "Bendix" drive with the ring gear 160 of the triple clutch 124 and simultaneously engaging drive train 214 clutch thus providing slow forward motion to the vehicle.

"Cruise" — When the accelerator switch 203 transfers to the cruise sector, drive train clutch 214 disengages, engine clutch 212 engages to re-start engine. When engine re-start sensor 215 condition is satisfied "Bendix" drive clutch 152 disengages, drive train clutch 214 engages and vehicle moves forward under engine power. In this mode, the forward motion sensor 114 indicates that vehicle velocity is sufficient to re-supply auxiliary flywheel energy directly and cause engine-auxiliary flywheel clutch 142 to engage through impeller drive. This continues until forward motion of vehicle drops below crawl speed, at which time the engine is turned off by the engine ignition interrupter 217 if battery level charge sensor 216 conditions are met.

I claim:

1. A power system for a vehicle having a body and a power-responsive motion producing means connected with the body for producing movement thereof, said power system including,
   engine means for operative connection with the motion producing means to supply power thereto for movement of the body,
   power takeoff means connected with said engine means for diverting a portion of the power output of said engine means,
   mechanical power storage means, connected with said power takeoff means, for accumulating and storing the power diverted by said power takeoff means in an amount sufficient to propel said vehicle for limited distances when the velocity of said vehicle has diminished to a predetermined speed, or from a standstill, utilizing only said accumulated power, and
   first selectively operable power connection means, independent of said power takeoff means, for operatively connecting only said mechanical power storage means directly with the motion producing means to supply stored power to the motion producing means when the speed of said vehicle is less than the predetermined speed while simultaneously rendering said engine means inoperative.

2. A power system as defined in claim 1 wherein,
   said power storage means includes flywheel means for storing mechanical rotational energy, and
   second selectively operable power connection means for connecting said power takeoff means with said flywheel means to supply stored power.

3. A power system as defined in claim 2 including,
   auxiliary power supply means adapted to be selectively coupled to said flywheel means when the energy stored by said flywheel means is insufficient to move said vehicle and said flywheel is uncoupled from said second power connection means.

4. A power system as defined in claim 3 wherein,
   said auxiliary power supply means is an electric motor operated by the vehicle battery.

5. A power system as defined in claim 3 including,
   means for sensing the energy level stored in said flywheel means and for activating the coupling of said auxiliary power supply means to said flywheel means.

6. A power system as defined in claim 2 wherein,
   said first and second selectively operable power connection means includes,
   selectively operable clutch means for alternatively connecting said flywheel means to said power takeoff means and said motion producing means.

7. A power system as defined in claim 6 including,
   means for sensing the forward speed of said vehicle to activate said clutch means to connect said flywheel means to said motion producing means and to disconnect said flywheel means from said power takeoff means, while opening said vehicle ignition circuit to render said engine means inoperative.

8. A power system as defined in claim 7 including,
   electric circuit means responsive to a predetermined speed of said vehicle for activating said clutch means to connect said flywheel means to said power takeoff means and to disconnect said flywheel means from said motion producing means, while closing said vehicle ignition circuit to revert said engine means to an operative mode.

9. A power system as defined in claim 8 including,
   auxiliary power supply means adapted to be selectively coupled to said flywheel means when the energy stored by said flywheel means is insufficient to move said vehicle and said flywheel is uncoupled from said second power connection means.

10. A power system as defined in claim 9 wherein,
    said auxiliary power supply means is an electric motor operated by the vehicle battery.

11. A power system as defined in claim 10 including,
    means for sensing the energy level stored in said flywheel means and for activating the coupling of said auxiliary power supply means to said flywheel means.

* * * * *